US008352951B2

(12) United States Patent
Das et al.

(10) Patent No.: US 8,352,951 B2
(45) Date of Patent: Jan. 8, 2013

(54) METHOD AND APPARATUS FOR UTILITY-BASED DYNAMIC RESOURCE ALLOCATION IN A DISTRIBUTED COMPUTING SYSTEM

(75) Inventors: Rajarshi Das, New Rochelle, NY (US); Jeffrey Owen Kephart, Cortlandt Manor, NY (US); Gerald James Tesauro, Croton-on-Hudson, NY (US); William Edward Walsh, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 12/164,896

(22) Filed: Jun. 30, 2008

(65) Prior Publication Data
US 2008/0263559 A1   Oct. 23, 2008

Related U.S. Application Data

(63) Continuation of application No. 10/768,563, filed on Jan. 30, 2004, now abandoned.

(51) Int. Cl.
G06F 9/46   (2006.01)
G06F 15/173   (2006.01)

(52) U.S. Cl. ........................... 718/104; 709/225
(58) Field of Classification Search ................... None
See application file for complete search history.

(56) References Cited

U.S. PATENT DOCUMENTS

| 6,154,778 | A | 11/2000 | Koistinen et al. |
| 6,370,560 | B1* | 4/2002 | Robertazzi et al. ........... 718/105 |
| 6,536,935 | B2 | 3/2003 | Parunak et al. |
| 6,625,577 | B1 | 9/2003 | Jameson |
| 6,851,115 | B1 | 2/2005 | Cheyer et al. |
| 6,957,113 | B1 | 10/2005 | Logsdon et al. |
| 7,310,672 | B2 | 12/2007 | Rolia |
| 2002/0069235 | A1 | 6/2002 | Chen |
| 2003/0028642 | A1 | 2/2003 | Agarwal et al. |
| 2003/0097443 | A1* | 5/2003 | Gillett et al. .................. 709/225 |
| 2004/0260664 | A1* | 12/2004 | Thiesson et al. ................ 706/21 |

(Continued)

FOREIGN PATENT DOCUMENTS

JP   2005182696 A   7/2005

OTHER PUBLICATIONS

Senevirante et al., "User centric QoS management framework and its implementation", 2001, Integrated Computer-Aided Engineering, vol. 7 Issue 4, p. 271, 15 p.

(Continued)

*Primary Examiner* — Kenneth Tang (57) ABSTRACT

In one embodiment, the present invention is a method for allocation of finite computational resources amongst multiple entities, wherein the method is structured to optimize the business value of an enterprise providing computational services. One embodiment of the inventive method involves establishing, for each entity, a service level utility indicative of how much business value is obtained for a given level of computational system performance. The service-level utility for each entity is transformed into a corresponding resource-level utility indicative of how much business value may be obtained for a given set or amount of resources allocated to the entity. The resource-level utilities for each entity are aggregated, and new resource allocations are determined and executed based upon the resource-level utility information. The invention is thereby capable of making rapid allocation decisions, according to time-varying need or value of the resources by each of the entities.

23 Claims, 5 Drawing Sheets

U.S. PATENT DOCUMENTS

2005/0021530 A1* 1/2005 Garg et al. .................. 707/100
2005/0097560 A1 5/2005 Rolia et al.

OTHER PUBLICATIONS

Kelly, T., "Utility-Directed Allocation," First Workshop on Algorithms and Architectures for Self-Managing Systems, Jun. 11, 2003, San Diego, CA.

Lalis, et al., "Market-driven Service Allocation in a QoS-capable Environment," ICE '98 Charleston, SC © ACM 1998, 92-100.

Thomas, et al., "A Market-Based Approach to Optimal Resource Allocation in Integrated-Services Connection-Oriented Networks," Operations Research, vol. xx, No. x, Xxx-Xxxx, 2002, pp. 1-14.

Yamaki, et al., A Market-Based Approach to Allocating Qos for Multimedia Applications, Proceedings of the Second International Conference on Multiagent Systems, Kyoto, Japan, Dec. 1996.

* cited by examiner

METHOD AND APPARATUS FOR UTILITY-BASED DYNAMIC RESOURCE ALLOCATION IN A DISTRIBUTED COMPUTING SYSTEM

CROSS REFERENCE TO RELATED APPLICATIONS

This application is a continuation of U.S. patent application Ser. No. 10/768,563, filed Jan. 30, 2004 now abandoned, entitled "METHOD AND APPARATUS FOR UTILITY-BASED DYNAMIC RESOURCE ALLOCATION IN A DISTRIBUTED COMPUTING SYSTEM", which is herein incorporated by reference in its entirety.

BACKGROUND

The present invention relates generally to data processing systems, and relates more particularly to the management of hardware and software components of data processing systems. Specifically, the present invention provides a method and apparatus for automatic allocation of computing resources amongst multiple entities that obtain value by utilizing the resources to perform computation.

The problem of how to optimally allocate a limited set of resources amongst multiple entities that use or consume the resources has been extensively studied in disciplines including economics, manufacturing, telecommunications networks, and computing systems. Within the latter domain, the recent evolution of highly interconnected, rapidly changing, distributed computing systems such as the Internet has made it increasingly important to be able to rapidly compute and execute resource allocation decisions in an automated fashion.

Traditional approaches to provisioning and capacity planning typically aim to achieve an extremal value of some overall system performance metric (e.g., maximum average throughput or minimum average response time). Other conventional techniques employ market-based mechanisms for resource allocation (e.g., auction bidding or bilateral negotiation mechanisms). For example, a commonly used approach has been to anticipate the maximum possible load on the system, and then perform one-time static allocation of resources capable of handling the maximum load within a specified margin of safety. A common problem with such approaches is that, with modern workloads such as hit rates on Web pages, the demand rate may vary dynamically and rapidly over many orders of magnitude, and a system that is statically provisioned for its peak workload may spend nearly all its time sitting idle.

Thus, there is a need in the art for a method and apparatus for dynamic resource allocation in distributed computing systems.

SUMMARY OF THE INVENTION

In one embodiment, the present invention is a method for optimal and automatic allocation of finite resources (e.g., hardware or software that can be used within any overall process that performs computation) amongst multiple entities that can provide computational services given the resource(s). One embodiment of the inventive method involves establishing, for each entity, a service level utility indicative of how much business value is obtained for a given level of computational system performance and for a given level of demand for computing service. Each entity is capable of transforming its respective service-level utility into a corresponding resource-level utility indicative of how much business value may be obtained for a given set or amount of resources allocated to the entity. The resource-level utilities for each entity are aggregated, and resource allocations are subsequently determined and executed based upon the dynamic resource-level utility information established. The invention is thereby capable of making rapid allocation decisions, according to time-varying need or value of the resources by each of the entities. In addition, the inventive method is motivated by the perspective of an enterprise comprising multiple entities that use said finite computational resources to provide service to one or more customers, and is thus structured to optimize the business value of the enterprise.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method for optimal and automatic allocation of finite resources amongst multiple entities that can perform computational work given the resource(s). For the purposes of the present invention, the term "resource" may indicate an entire hardware or software component (e.g., a compute server, a storage device, a RAM circuit or a database server), or a portion of a component (e.g., bandwidth access or a fraction of a server). The method may be implemented, for example, within a data processing system such as a network, a server, or a client computer. The invention is capable of making allocation decisions in real time, according to time-varying need or value of the resources by each of the entities, thereby resolving the shortcomings associated with typical static resource allocation techniques. In addition, the method is structured to optimize the business value of an enterprise that provides computing services to multiple entities using said finite computational resources.

Figure 1:
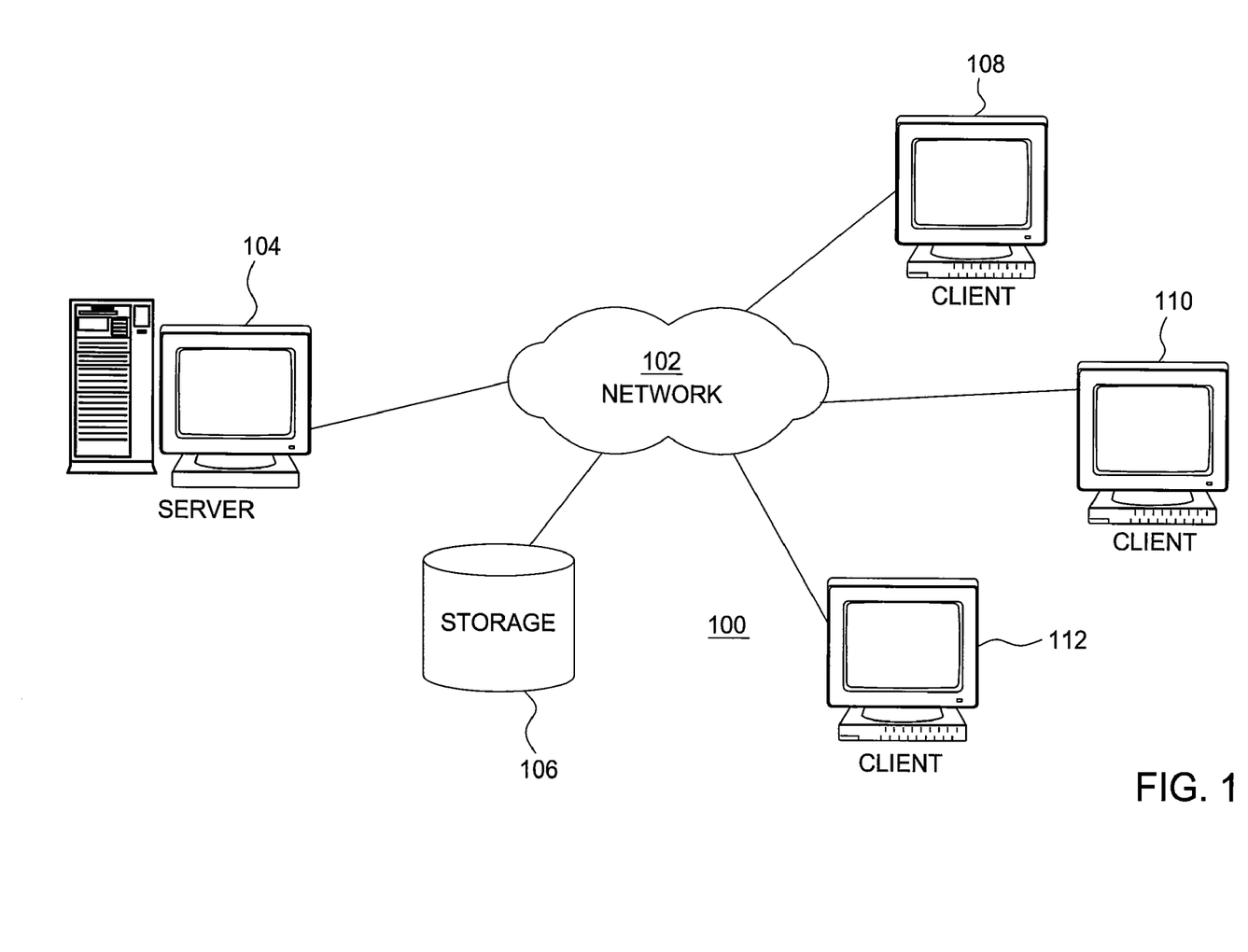
FIG. 1 is a diagram of a networked data processing system in which the present invention may be implemented.

FIG. 1 is a schematic illustration of one embodiment of a network data processing system 100 comprising a network of computers (e.g., clients) in which the present invention may be implemented. The network data processing system 100 includes a network 102, a server 104, a storage unit 106 and a plurality of clients 108, 110 and 112. The network 102 is the medium used to provide communications links between the server 104, storage unit 106 and clients 108, 110, 112 connected together within network data processing system 100. The network 102 may include connections, such as wire, wireless communication links, or fiber optic cables.

In the embodiment illustrated, the server 104 provides data, such as boot files, operating system images, and applications to the clients 108, 110, 112 (i.e., the clients 108, 110, and 112 are clients to server 104). The clients 108, 110, and 112 may be, for example, personal computers or network computers. Although the network data processing system 100 depicted in FIG. 1 comprises a single server 104 and three clients, 108, 100, 112, those skilled in the art will recognize that the network data processing system 100 may include additional servers, clients, and other devices not shown in FIG. 1.

In one embodiment, the network data processing system 100 is the Internet, with the network 102 representing a worldwide collection of networks and gateways that use the Transmission Control Protocol/Internet Protocol (TCP/IP) suite of protocols to communicate with one another. In further embodiments, the network data processing system 100 is implemented as an intranet, a local area network (LAN), or a wide area network (WAN). Furthermore, although FIG. 1 illustrates a network data processing system 100 in which the method of the present invention may be implemented, those skilled in the art will realize that the present invention may be implemented in a variety of other data processing systems, including servers (e.g., server 104) and client computers (e.g., clients 108, 110, 112). Thus, FIG. 1 is intended as an example, and not as an architectural limitation for the present invention.

Figure 2:
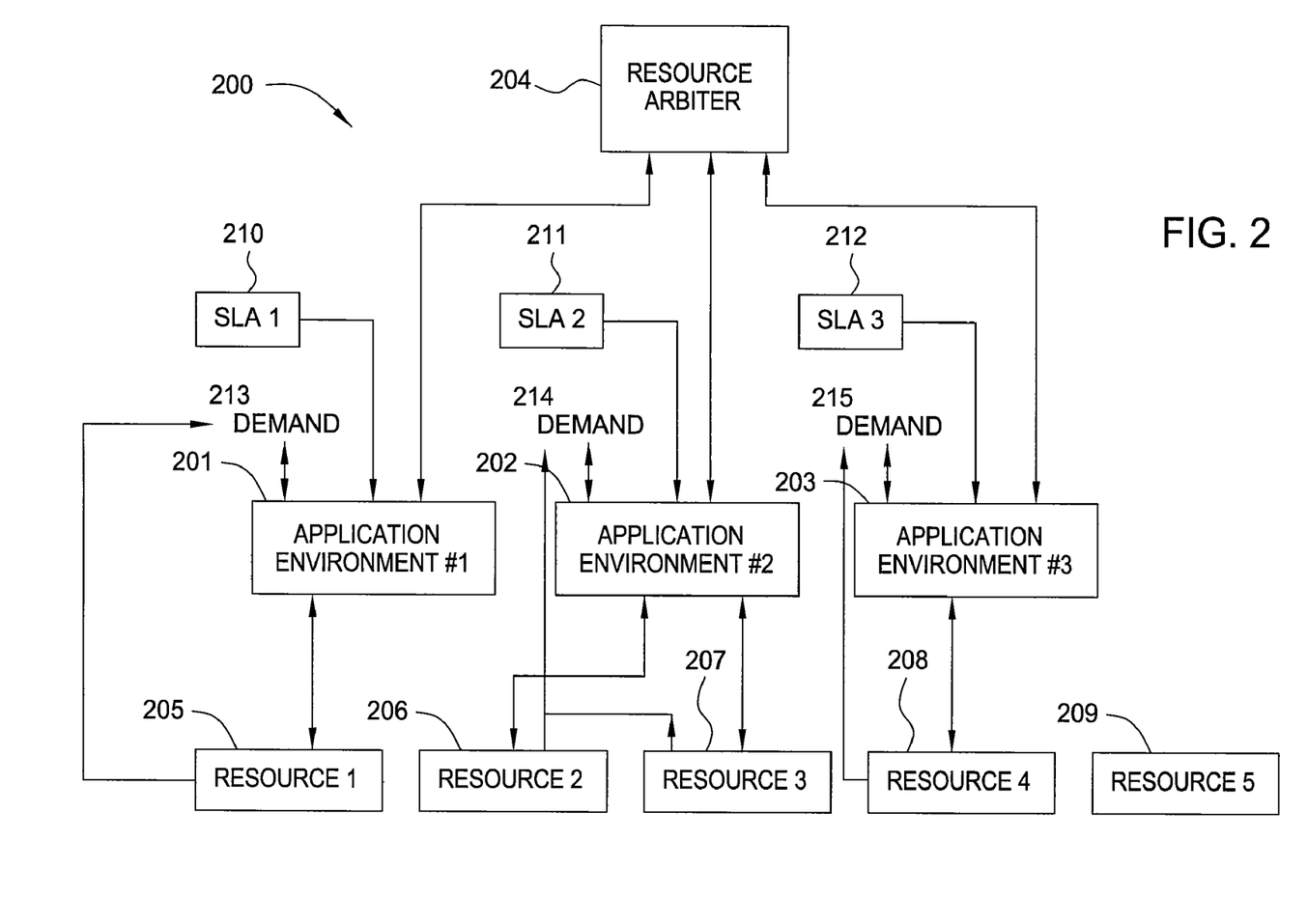
FIG. 2 is an overall view of a resource allocation system in accordance with one embodiment of the present invention.

FIG. 2 is a schematic illustration of one embodiment of a data center 200 for executing the method of the present invention. The data center 200 comprises a plurality of application environment modules 201, 202, and 203, one or more resource arbiters 204 and a plurality of resources 205, 206, 207, 208 and 209. Each application environment module 201-203 is responsible for handling respective demands 213, 214 and 215 (e.g., requests for information processing services) that may arrive from a particular customer or set of clients (e.g., clients 108-112 in FIG. 1). Example client types include: online shopping services, online trading services, and online auction services.

In order to process client demands 213, 214 or 215, the application environments 201-203 may utilize the resources 205-209 within the data center 200. As each application environment 201-203 is independent from the others and provides different services, each application environment 201-203 has its own set of resources 205-209 at its disposal, the use of which must be optimized to maintain the appropriate quality of service (QoS) level for the application environment's clients. An arrow from an application environment 201-203 to a resource 205-209 denotes that the resource 205-209 is currently in use by the application environment 201-203 (e.g., in FIG. 2, resource 205 is currently in use by application environment 201). An application environment 201-203 also makes use of data or software objects, such as respective Service Level Agreements (SLAs) 210, 211 and 212 with its clients, in order to determine its service-level utility function U(S,D). An example SLA 210-212 may specify payments to be made by the client based on mean end-to-end response time averaged over, say, a five-minute time interval. Additionally the client workload may be divided into a number of service classes (e.g., Gold, Silver and Bronze), and the SLA 210-212 may specify payments based on details of response time characteristics within each service class.

Each application environment 201-203 is in further communication with the resource arbiter module 204. Although the data center 200 illustrated in FIG. 2 utilizes only one resource arbiter 204, those skilled in the art will appreciate that multiple resource arbiters may be implemented in the data center 200. The resource arbiter 204 is responsible for deciding, at any given time while the data center 200 is in operation, which resources 205-209 may be used by which application environments 201-203. In one embodiment, the application environments 201-203 and resource arbiter 204 are software modules consisting of autonomic elements (e.g., software components that couple conventional computing functionality with additional self-management capabilities), for example written in Java™, and communication between modules 201-203 and 204 takes place using standard Java interfaces. The modules 201-203 and 204 may run on a single computer or on different computers connected by a network such as the Internet or a Local Area Network (LAN), e.g., as depicted in FIG. 1. In the networked case, communication may additionally employ standard network communication protocols such as TCP/IP and HTTP, and standard Web interfaces such as OGSA.

Figure 3:
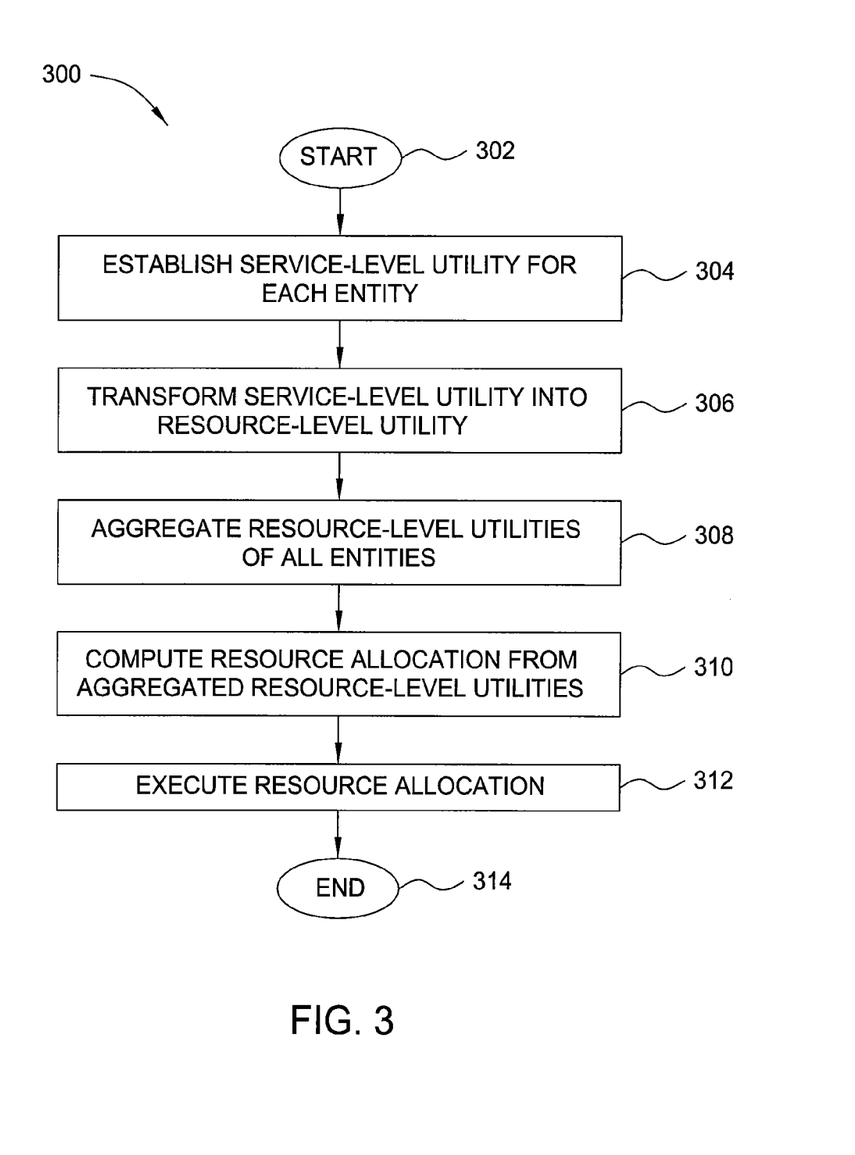
FIG. 3 is a flow chart illustrating one embodiment of a method for dynamically allocating resources among multiple application environments.

FIG. 3 is a flow chart illustrating the method 300 by which the resource arbiter 204 makes resource allocation decisions. Referring simultaneously to FIGS. 2 and 3, the method 300 is initialized at block 302 and proceeds to block 304, where the method 300 establishes a service-level utility function U(S, D) for each application environment 201-203. In one embodiment, the variable S is a vector that characterizes the multiple performance measures for multiple service classes, and the variable D is a vector that characterizes the demand. The service level utility indicates how much business value U is obtained by the application environment 201, 202 or 203 for various levels S of computational system performance, and for a given level D of demand 213-215 for computing service.

In one embodiment, the service-level utility function U(S, D) is established by the application environment's SLA 210-212. While each application environment's service-level utility may be based on different performance metrics, all of the service-level utility functions U(S, D) share a common scale of valuation.

In block 306, the method 300 transforms the service-level utility function U(S, D) into a resource-level utility function V(R) for each application environment 201-203. The resource level utility indicates how much business value V is obtained for a given actual or hypothetical set or amount of resources R (e.g., selected from resources 205-209) allocated to the application environment 201-203. In one embodiment, R is a vector. For example, the utility information may express a utility curve V(m), the utility obtained from being able to use m compute servers, at various values of m ranging from 0 to the total number of compute servers within the data center. Additionally if the servers are of different types, the utility information may express the value of obtaining m servers of type A, n servers of type B, etc. More generally the utility information may express V({x}), the value of assigning a particular collection or set {x} of resources 205-209, for various sets {x} ranging over the power set of possible resources 205-209 that could be assigned to the application environment 201-203. The utility information may be expressed, for example, in a parameterized functional form, or it may also be expressed in terms of values at a set of discrete points which may represent a subset or complete set of all possible resource levels that could be provided.

The transformation may additionally depend on a set of variables describing the application environment's current state (e.g., current demand 213-215, system load, throughput or average response time), or on differences between a hypothetical resource allocation R and the application environment's current resource allocation R* (e.g., in a manner that reflects any costs associated with switching the allocation from R* to R, including delays, machine downtime, etc.). In one embodiment, the resource-level utility function is calculated according to the relation $$V_i(R_i) = U_i(S_i, D_i, R_i) \quad \text{(EQN. 1)}$$

such that $S_i \epsilon S_i(R_i, D_i)$, where $S_i(R_i, D_i)$ is a relation specifying the set of service levels attainable with resources $R_i$ and demand $D_i$. In one embodiment, the relation $S_i(R_i, D_i)$ is obtained by standard computer systems modeling techniques (e.g., queuing theory). In another embodiment, the relation $S_i(R_i, D_i)$ may instead or additionally be refined by training on a collection of observed system performance data $\{(S_t, R_t, D_t)\}$ using standard machine learning procedures (e.g., supervised learning methods employing standard linear or nonlinear function approximators).

In one embodiment, the resource-level utility function V(R) estimates the current value of the current state. In another embodiment, the resource-level utility function estimates the expected cumulative discounted or undiscounted future value starting from the current state. In one embodiment, any one or more of a number of standard methodologies may be employed in the process of estimating expected future value, including prediction and forecasting methodologies such as time-series prediction methods and machine learning methodologies such as reinforcement learning algorithms (e.g., Q-Learning, Temporal Difference Learning, R-Learning or SARSA).

In block 308, the method 300 communicates the respective resource-level utility functions for each application environment 201-203 to the resource arbiter 204 and aggregates all resource level utility functions. In one embodiment, while the data center 200 is running, from time to time each application environment 201-203 communicates to the resource arbiter 204 information regarding its current resource-level utility function. Said communication may take place either synchronously or asynchronously, and may be initiated by the application environments 201-203, or may be in response to a prompt or query issued by the resource arbiter 204.

In block 310, the method 300, having received resource-level utility information from each application environment 201-203, combines said utility information and thereupon decides how to assign each available resource 205-209 in the data center 200, in a manner that optimizes the total utility obtained. In other words, the resource arbiter 204 maximizes the sum of the resource-level utilities, $$\max_{R \in R} \sum_i V_i(R_i).$$

Said resource assignment may include the possibility of a null assignment, (i.e., the resource 205-209 is not assigned to any application environment 201-203) so that the resource 205-209 may be kept in reserve to handle future workload. For example, in the case of undifferentiated compute servers within the data center 200, the resource arbiter 204 may utilize the most recent utility curves from each application environment 201-203 ($V_1(m)$, $V_2(m)$ and $V_3(m)$ respectively), and then compute an integral number of servers ($m_1$, $m_2$, $m_3$) to assign to each application environment 201-203 so as to maximize the total $V_1(m_1)+V_2(m_2)+V_3(m_3)$. The determination of an allocation that optimizes total utility will generally be made by executing an optimization method. In one embodiment, the values ($m_1$, $m_2$, $m_3$) are found by using standard linear or nonlinear algorithms such as hill climbing, simulated annealing, linear programming, or mixed-integer programming. Additionally, the objective function optimized by the resource arbiter 204 may also include any switching costs that are incurred when a particular resource 205-209 is reallocated from one application environment 201-203 to another. Said switching costs may include, for example, machine downtime and/or other costs related to installing or removing data or software from the machine when it is reallocated.

In block 312, the method 300 executes the resource allocation decision calculated in block 310, and communicates the resource allocation decision to the application environments 201-203. In one embodiment, block 312 additionally involves the causation of manipulations or operations performed upon the resources 205-209, enabling the resources 205-209 to be used by the application environments 201-203 to which the resources 205-209 have been assigned, or associated with de-allocating a resource 205-209 from an application environment 201-203 to which the resource 205-209 is no longer assigned.

Figure 4:
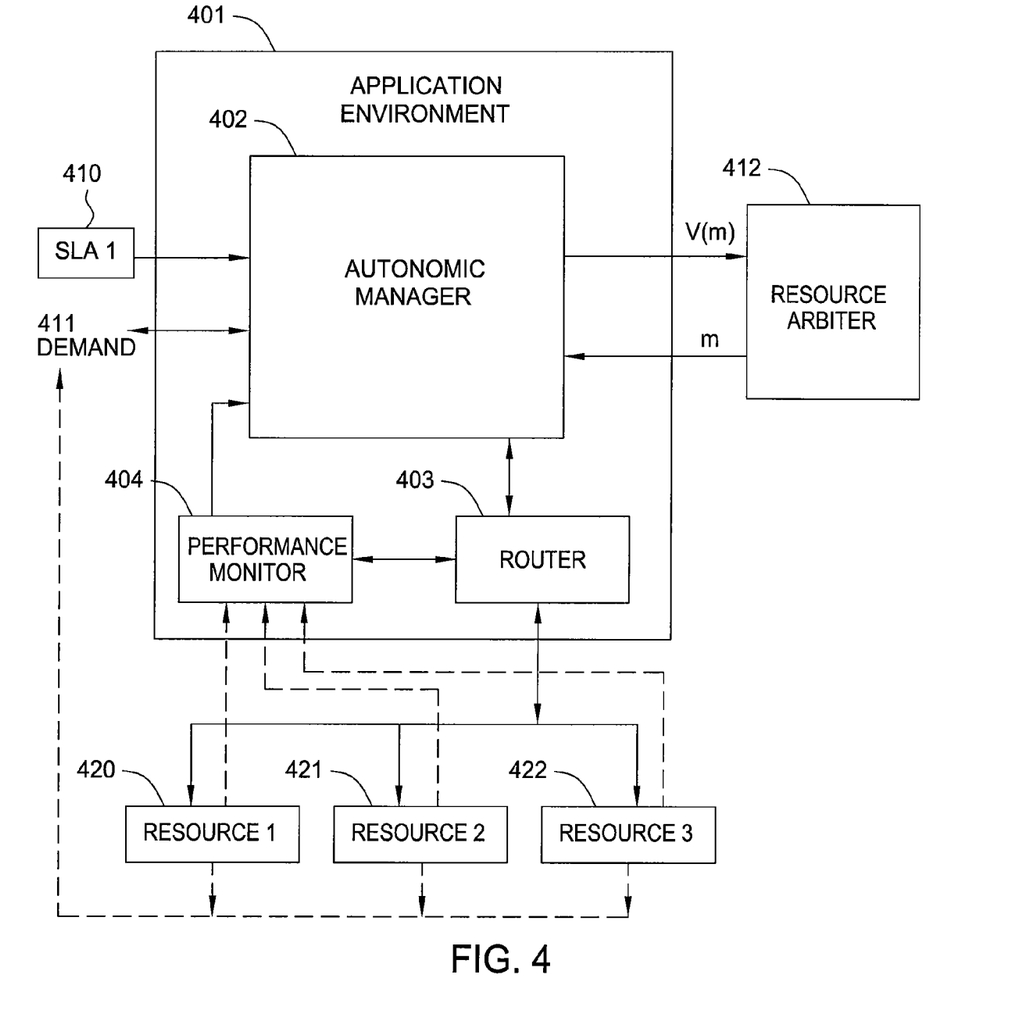
FIG. 4 is a diagram illustrating the detailed functionality of an application environment module which constitutes a component of the overall system shown in FIG. 2.

FIG. 4 is a schematic illustration of the basic operations and functionality of one embodiment of an application environment module 401 according to the present invention, wherein the application environment module 401 is any of the application environments 201-203 depicted in FIG. 2. In one embodiment, the application environment module 401 comprises an autonomic manager element 402, a workload router 403, and a system performance monitoring element 404. Interactions of the application environment 401 with its SLA 410, its client demand 411, its currently allocated resources (e.g., compute servers 420, 421, and 422), and with the resource arbiter element 412, are depicted as they were in FIG. 2.

While the application environment 401 is in operation, from time to time client demand 411 is received and transmitted to the router 403, which thereupon sends said demand 411 to one of the assigned compute servers 420, 421, or 422, typically based on the use of a routing or load-balancing method. As client jobs are processed, their intermediate and final output are returned to the submitting client. From time to time the performance monitor 404 may observe, request or receive information regarding measures or statistics of the system performance of the compute servers 420-422, such as CPU/memory usage, average throughput, average response time, and average queue depth. The autonomic manager 402 combines said performance measures with information regarding the demand 411, the SLA 610, and the currently allocated resources 420-422, to produce an estimated resource-level utility function.

In one embodiment, said utility function indicates V(m), the value of being allocated an integral quantity m of undifferentiated compute servers, with the value of m ranging from zero to the total number of servers in the data center (e.g., data center 200 in FIG. 2). From time to time said utility function is transmitted to the resource arbiter 412, possibly in response to a prompt or query sent from the resource arbiter 412. From time to time said resource arbiter 412 will additionally transmit to the application environment 401 updated information regarding its set of allocated resources. The updated information indicates, for example, that certain compute servers 420-422 are newly available for usage, or that certain compute servers 420-422 previously used by the application environment 401 are to be de-allocated and are no longer available for usage.

In another embodiment, the autonomic manager module 402 of FIG. 4 further comprises a capability to model the effect of any adjustable operational parameters the resources 420-422 may have (e.g., maximum queue depth, buffer pool sizes, etc.) on the observed system performance. The autonomic manager 402 further operates to set said parameters of the resources 420-422, or of the router 403, or other internal parameters, to values such that the resulting system-level utility function optimizes the resource-level utility function.

In another embodiment of the invention, the autonomic manager module 402 of FIG. 4 further comprises a capability to model or predict the demand at future times given the observed current demand 411, and a capability to model or predict the system performance at future times given the current demand 411, current performance, and future allocated resources, which may be the same or different from the current allocated resources 420-422. The autonomic manager 402 then computes a resource-level utility function indicating the cumulative discounted or undiscounted future utility associated with a hypothetical resource allocation made at the current time. In one embodiment, the predicted demand and predicted system performance are deterministic predictions at each future time. In another embodiment, the predicted demand and predicted system performance are probability distributions over possible levels of demand or performance at each future time. In one embodiment, the cumulative future utility is obtained by summation over a finite number of discrete future time steps. In another embodiment, the cumulative future utility is obtained by integration over a continuous future time interval.

In another embodiment of the invention, the autonomic manager module 402 of FIG. 4 does not explicitly predict future demand or future system performance, but instead uses machine learning procedures to estimate cumulative discounted or undiscounted future utility from a temporal sequence of observed data points, each data point consisting of: an observed demand, an observed system performance, an observed resource allocation, and an observed payment as specified by the SLA 410. In one embodiment, the machine learning procedure consists of a standard reinforcement learning procedure such as Q-Learning, Temporal Difference Learning, R-Learning or SARSA.

Figure 5:
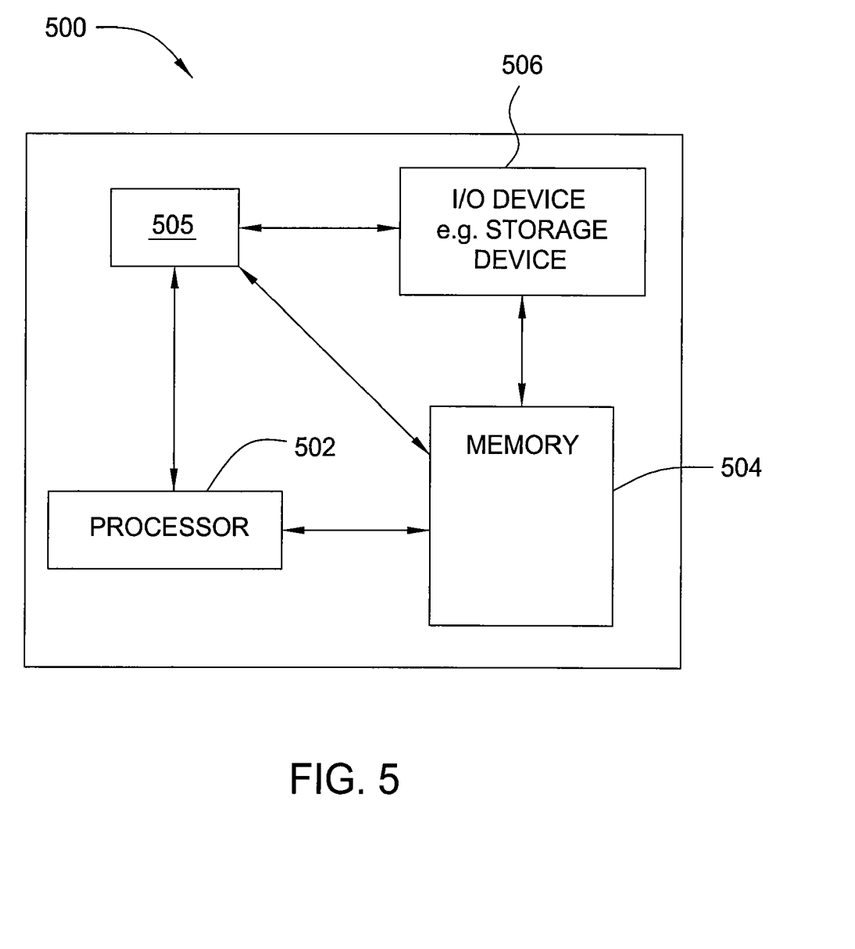
FIG. 5 is a high level block diagram of the present invention implemented using a general purpose computing device.

FIG. 5 is a high level block diagram of the present dynamic resource allocation system that is implemented using a general purpose computing device 500. In one embodiment, a general purpose computing device 500 comprises a processor 502, a memory 504, a dynamic resource allocator or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the dynamic resource allocator 505 can be implemented as a physical device or subsystem that is coupled to a processor through a communication channel.

Alternatively, the dynamic resource allocator 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the resource allocator 505 for allocating resources among entities described herein with reference to the preceding Figures can be stored on a computer readable medium or carrier (e.g., RAM, magnetic or optical drive or diskette, and the like).

The functionalities of the arbiters and the application environments described with reference to FIGS. 2 and 4 may be performed by software modules of various types. For example, in one embodiment, the arbiters and/or application environments comprise autonomic elements. In another embodiment, the arbiters and/or application environments comprise autonomous agents software as may be constructed, for example, using the Agent Building and Learning Environment (ABLE). The arbiters and/or application environments may all run on a single computer, or they may run independently on different computers. Communication between the arbiters and the application environments may take place using standard interfaces and communication protocols. In the case of arbiters and application environments running on different computers, standard network interfaces and communication protocols may be employed, such as Web Services interfaces (e.g., those employed in the Open Grid Services Architecture (OGSA)).

Thus, the present invention represents a significant advancement in the field of dynamic resource allocation. A method and apparatus are provided that enable a finite number of resources to be dynamically allocated among a number of entities or application environments capable of performing computational work given the resources. The allocation is performed in a manner that optimizes the business value of the enterprise providing the computing services to a number of clients.

While foregoing is directed to the preferred embodiment of the present invention, other and further embodiments of the invention may be devised without departing from the basic scope thereof, and the scope thereof is determined by the claims that follow.

The invention claimed is:

1. An automated method for allocating resources among a plurality of resource-using computational entities in a data processing system, the method comprising:
 establishing a service-level utility for each of said plurality of resource-using computational entities; and
 transforming said service-level utility into a resource-level utility for each of said plurality of resource-using computational entities,
 wherein the resource-level utility is representative of an amount of business value obtained by each of said plurality of resource-using computational entities when a quantity of said resources is allocated to the each of said plurality of resource-using computational entities,
 wherein the resource-level utility indicates, for at least one of said plurality of resource-using computational entities, an estimated cumulative discounted or undiscounted future utility starting from current state descriptions of said at least one of said plurality of resource-using computational entities,
 wherein the estimated cumulative discounted or undiscounted future utility is trained on a temporal sequence of observed data using an adaptive machine learning procedure,
 wherein the machine learning procedure is a reinforcement learning procedure,
 and wherein the reinforcement learning procedure is Q-Learning, Temporal Difference Learning, R-Learning or SARSA.

2. The method of claim 1, wherein the resource-level utility is a function of client demand received by one of said plurality of resource-using computational entities and of a service-level agreement governing the performance of said one of said plurality of resource-using computational entities.

3. The method of claim 1, wherein the service-level utility is representative of an amount of business value obtained by each of said plurality of resource-using computational entities for various levels of performance and demand associated with the each of said plurality of resource-using computational entities.

4. The method of claim 1, further comprising steps of:
aggregating said resource-level utilities of all of said plurality of resource-using computational entities to produce aggregated utility information; and
computing a resource allocation from the aggregated utility information.

5. The method of claim 4, further comprising a step of:
executing and conveying to the plurality of resource-using computational entities said resource allocation.

6. The method of claim 4, wherein the aggregating said resource-level utilities of all of said plurality of resource-using computational entities is initiated by said plurality of resource-using computational entities.

7. The method of claim 4, wherein the aggregating said resource-level utilities of all of said plurality of resource-using computational entities is initiated by at least one resource arbiter adapted to compute said resource allocation from the aggregated utility information.

8. The method of claim 4, wherein the computing a resource allocation from the aggregated utility information comprises executing an optimization method to maximize a total utility of said data processing system.

9. The method of claim 8, wherein said optimization method comprises a standard linear or nonlinear algorithm.

10. The method of claim 9, wherein said optimization method is hill climbing, simulated annealing, linear programming or mixed-integer programming.

11. The method of claim 4, wherein the computing a resource allocation from the aggregated utility information comprises computing a cost that may be incurred in reallocating at least one of said resources from one of said plurality of resource-using computational entities to another of said plurality of resource-using computational entities.

12. The method of claim 1, wherein at least one of said plurality of resource-using computational entities operates to set its internal parameters, or an adjustable parameter of the resources the at least one of said plurality of resource-using computational entities has been allocated so as to optimize the service-level utility, the resource-level utility, or both.

13. The method of claim 1, wherein the estimated cumulative discounted or undiscounted future utility is based, for at least one of said plurality of resource-using computational entities, upon predictions of future state descriptions of said at least one of said plurality of resource-using computational entities.

14. A non-transitory computer readable medium containing an executable program for allocating resources among a plurality of resource-using computational entities in a data processing system, where the program performs steps of:
establishing a service-level utility for each of said plurality of resource-using computational entities; and
transforming said service-level utility into a resource-level utility for each of said plurality of resource-using computational entities,
wherein the resource-level utility is representative of an amount of business value obtained by each of said plurality of resource-using computational entities when a quantity of said resources is allocated to the each of said plurality of resource-using computational entities,
wherein the resource-level utility indicates, for at least one of said plurality of resource-using computational entities, an estimated cumulative discounted or undiscounted future utility starting from current state descriptions of said at least one of said plurality of resource-using computational entities,
wherein the estimated cumulative discounted or undiscounted future utility is trained on a temporal sequence of observed data using an adaptive machine learning procedure,
wherein the machine learning procedure is a reinforcement learning procedure,
and wherein the reinforcement learning procedure is Q-Learning, Temporal Difference Learning, R-Learning or SARSA.

15. The non-transitory computer readable medium of claim 14, wherein said program further performs steps of:
aggregating said resource-level utilities of all of said plurality of resource-using computational entities to produce aggregated utility information; and
computing a resource allocation from the aggregated utility information.

16. The non-transitory computer readable medium of claim 15, wherein said program further performs a step of:
executing and conveying to the plurality of resource-using computational entities said resource allocation.

17. The non-transitory computer readable medium of claim 16, wherein computing the resource allocation from the aggregated utility information comprises executing an optimization algorithm to maximize a business value of said data processing system.

18. The non-transitory computer readable medium of claim 14, wherein at least one of said plurality of resource-using computational entities operates to set its internal parameters, or an adjustable parameter of the resources the at least one of said plurality of resource-using computational entities has been allocated so as to optimize the service-level utility, the resource-level utility, or both.

19. A data processing system, comprising:
a plurality of processors adapted for processing client demands;
a plurality of resources adapted for allocation to said plurality of processors; and
at least one resource arbiter adapted for allocating said plurality of resources among said plurality of processors in a manner that optimizes a business value of the data processing system, wherein said at least one resource arbiter performs operations comprising:
establishing a service-level utility for each of said plurality of processors; and
transforming said service-level utility into a resource-level utility for each of said plurality of processors,
wherein the resource-level utility is representative of an amount of business value obtained by each of said plurality of processors when a quantity of said plurality of resources is allocated to the each of said plurality of processors,
wherein the resource-level utility indicates, for at least one of said plurality of processors, an estimated cumulative discounted or undiscounted future utility starting from current state descriptions of said at least one of said plurality of processors,
wherein the estimated cumulative discounted or undiscounted future utility is trained on a temporal sequence of observed data using an adaptive machine learning procedure,
wherein the machine learning procedure is a reinforcement learning procedure, and wherein the reinforcement learning procedure is Q-Learninq, Temporal Difference Learning, R-Learninq or SARSA.

20. The data processing system of claim 19, wherein said plurality of processors and said at least one resource arbiter are run on a single computer.

21. The data processing system of claim 19, wherein said plurality of processors and said at least one resource arbiter are run on different computers connected by a network.

22. The data processing system of claim 19, wherein said plurality of processors and said at least one resource arbiter are software modules comprising autonomic elements.

23. The data processing system of claim 19, wherein the data processing system is a server, a client computer or a network.

\* \* \* \* \*